US012562883B2

(12) United States Patent
Abadi et al.

(10) Patent No.: US 12,562,883 B2
(45) Date of Patent: Feb. 24, 2026

(54) SYNCHRONIZED TWO-WAY DIRECT CURRENT (DC) DATA-BUS-INVERSION ENCODING FOR SIMULTANEOUS BI-DIRECTIONAL SIGNALING

(71) Applicant: NVIDIA Corporation, Santa Clara, CA (US)

(72) Inventors: Ofek Abadi, Nahariya (IL); Ido Yatzkar, Mishmarmot (IL)

(73) Assignee: NVIDIA Corporation, Santa Clara, CA (US)

( * ) Notice: Subject to any disclaimer, the term of this patent is extended or adjusted under 35 U.S.C. 154(b) by 317 days.

(21) Appl. No.: 18/488,253

(22) Filed: Oct. 17, 2023

(65) Prior Publication Data
US 2025/0125940 A1 Apr. 17, 2025

(51) Int. Cl.
*H04L 5/14* (2006.01)
*H04L 7/04* (2006.01)

(52) U.S. Cl.
CPC ............ *H04L 5/1461* (2013.01); *H04L 7/042* (2013.01)

(58) Field of Classification Search
None
See application file for complete search history.

(56) References Cited

U.S. PATENT DOCUMENTS

2018/0241541 A1* 8/2018 Rogers ................... H03L 7/091

OTHER PUBLICATIONS

Nishi et al., "A 0.297-pJ/bit 50.4-GB/s/wire Inverter-Based Short-Reach Simultaneous Bidirectional Transceiver for Die-to-Die Interface in 5nm CMOS," 2022 Symposium on VLSI Technology & Circuits Digest of Technical Papers, pp. 154-155.

* cited by examiner

*Primary Examiner* — Minh Trang T Nguyen
(74) *Attorney, Agent, or Firm* — Lowenstein Sandler LLP

(57) ABSTRACT

A system includes first transceivers coupled to data lanes, which are coupled to second transceivers and a first encoder coupled to the first transceivers. The first encoder, responsive to detecting a transmission signal to begin a transmission mode, determines that first bits to be transmitted by the first transceivers over the data lanes include over fifty percent of a first binary value. The first encoder generates a first data-bus-inversion (DBI) polarity signal that alternates in polarity and generates first DBI-encoded bits of the first of bits based on the first DBI polarity signal. The first encoder causes the transmission signal to be transmitted to a second encoder coupled to the second transceivers, the transmission signal to synchronize DBI encoding between the first and second encoders.

20 Claims, 9 Drawing Sheets

600

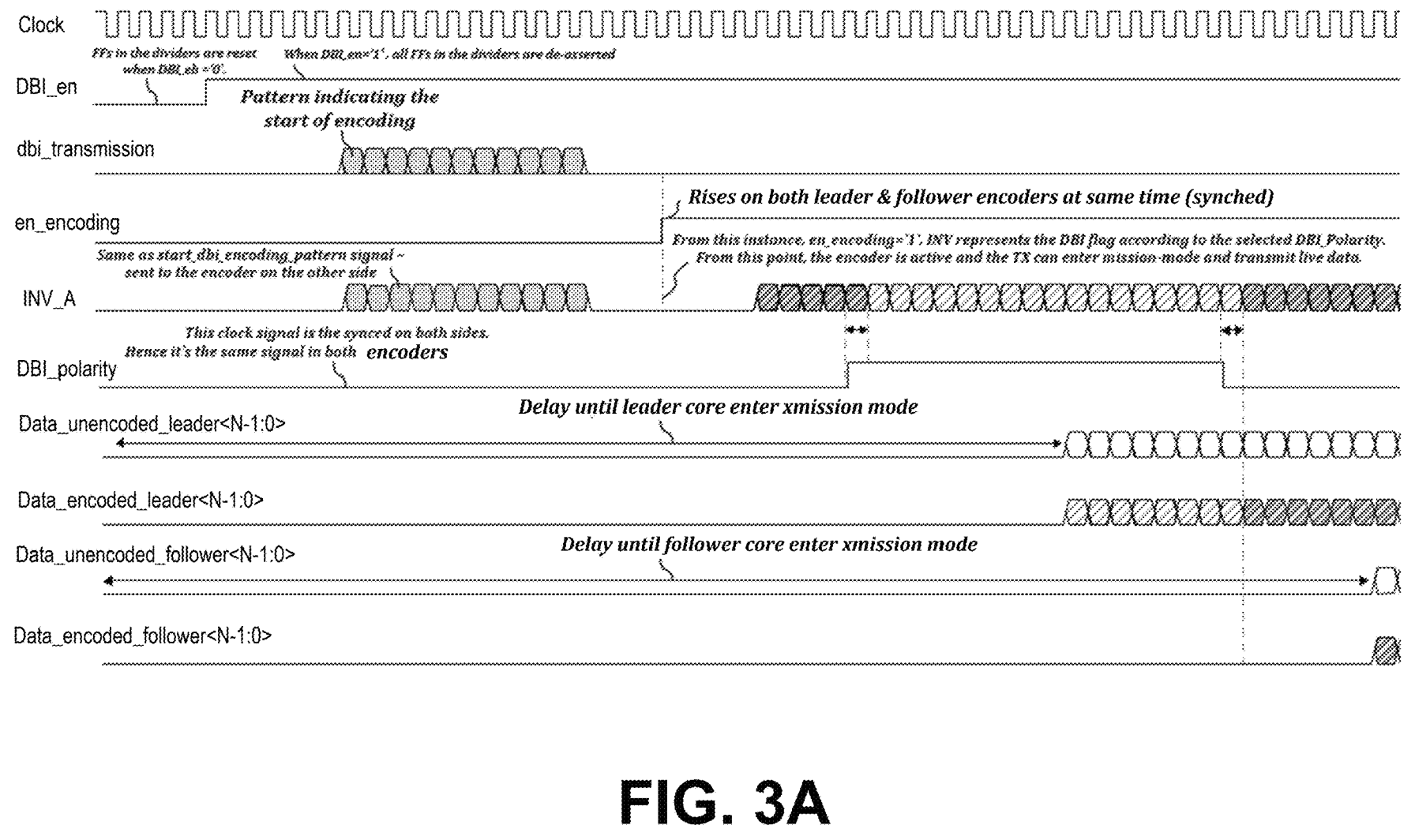

Clock

DBI_en

*FFs in the dividers are reset when DBI_en='1', all FFs in the dividers are de-asserted when DBI_en ='0'.* dbi_transmission

*Pattern indicating the start of encoding* en_encoding

*Rises on both leader & follower encoders at same time (synched)*

*Same as start_dbi_encoding_patterns signal sent to the encoder on the other side*

INV_A

*From this instance, en_encoding='1'. INV represents the DBI flag according to the selected DBI Polarity. From this point, the encoder is active and the TS can enter mission mode and transmit live data.*

*This clock signal is the synced signal in both sides. Hence it's the same signal in both encoders*

DBI_polarity

*Delay until leader core enter xmission mode*

Data_unencoded_leader<N-1:0>

Data_encoded_leader<N-1:0>

*Delay until follower core enter xmission mode*

Data_unencoded_follower<N-1:0>

Data_encoded_follower<N-1:0>

FIG. 3A

*en='0': All FFs reset and their outputs are set to '0'.*
*en='1': reset is de-asserted.*

600

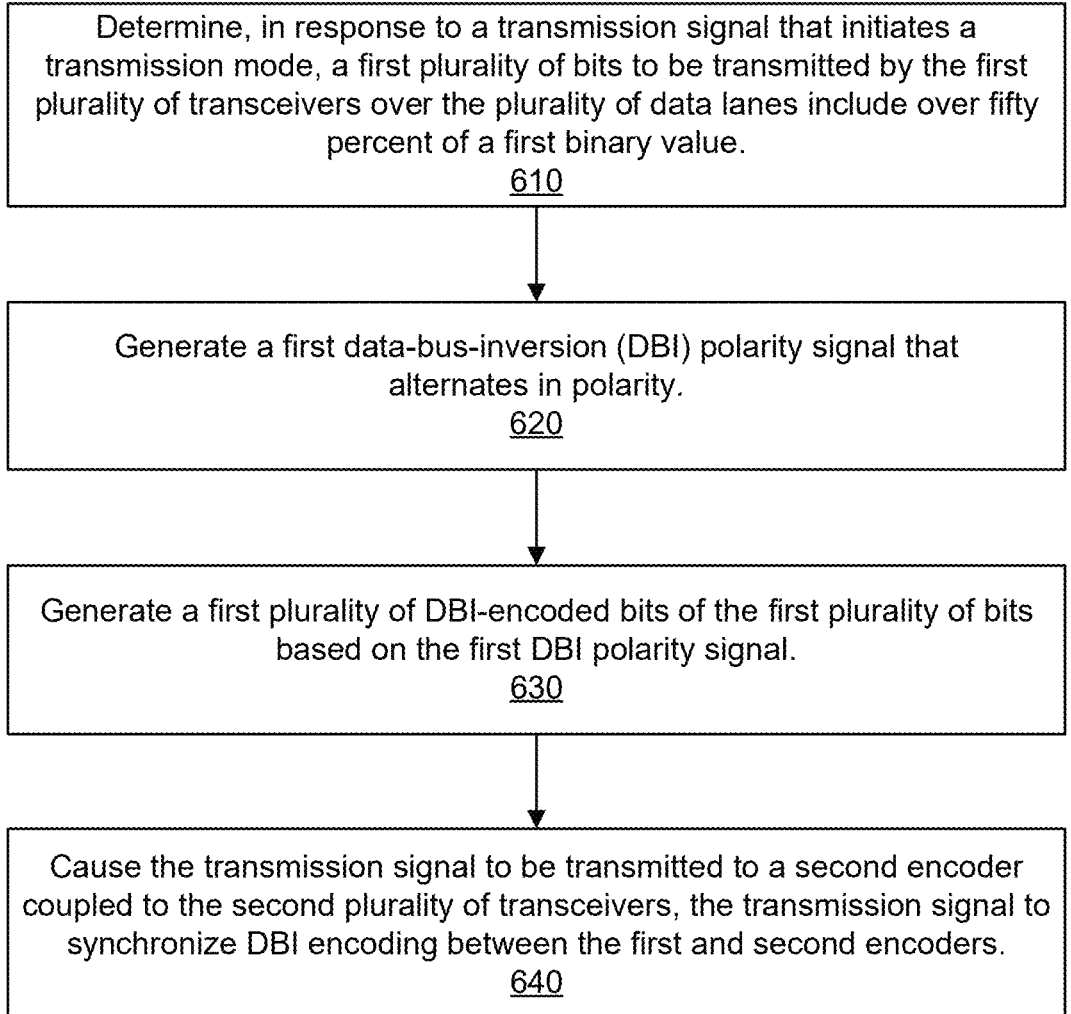

Determine, in response to a transmission signal that initiates a transmission mode, a first plurality of bits to be transmitted by the first plurality of transceivers over the plurality of data lanes include over fifty percent of a first binary value.
610

Generate a first data-bus-inversion (DBI) polarity signal that alternates in polarity.
620

Generate a first plurality of DBI-encoded bits of the first plurality of bits based on the first DBI polarity signal.
630

Cause the transmission signal to be transmitted to a second encoder coupled to the second plurality of transceivers, the transmission signal to synchronize DBI encoding between the first and second encoders.
640

FIG. 6

SYNCHRONIZED TWO-WAY DIRECT CURRENT (DC) DATA-BUS-INVERSION ENCODING FOR SIMULTANEOUS BI-DIRECTIONAL SIGNALING

TECHNICAL FIELD

At least one embodiment generally pertains to communication systems, and more specifically, but not exclusively, to synchronized two-way DC data-bus-inversion encoding for simultaneous bidirectional signaling.

BACKGROUND

In parallel interfaces of some communication systems, such as die-to-die and chip-to-chip, there exists a need to increase the data bandwidth-to-area efficiency, e.g., total transmitted bandwidth per total transceiver area, and bandwidth-to-pins efficiency, e.g., total transmitted bandwidth per total number of pins used for communication. In simultaneous bidirectional (SBD) signaling, there are two transceivers, one on each side of each communication channel (e.g., data lane). A transceiver includes a transmitter and a receiver. Therefore, the total transmitted bandwidth is doubled (due to transmitting and receiving simultaneously via a full-duplex channel) compared to unidirectional signaling, and both the bandwidth-to-area efficiency and the bandwidth-to-pins efficiency can be increased.

Receiving data while transmitting, however, as performed in SBD signaling over a full-duplex channel, requires that a transceiver cancels the transmitted data signal in a hybrid structure shared with the receiver (RX) of the transceiver. While this approach cancels interference from the transmitter (TX) for the RX of the transceiver, the approach also wastes static power in generating a constant current flow that does not depend on transitions of the data during normal operation of the parallel interface.

Since the bandwidth-to-pins efficiency and bandwidth-to-area efficiency are important metrics sought to be optimized, many parallel communication systems (including some SBD communication systems) are implemented using single-ended signaling. In single-ended signaling, a signal is transmitted over one wire, with another wire used as a ground or reference voltage. Furthermore, in parallel interfaces in general and in SBD interfaces in particular, there are many transceivers on each side. Since each transceiver is duplicated many times in this parallel communication system, reducing power consumption in each transceiver translates to a significant power consumption saving in the overall communication system.

BRIEF DESCRIPTION OF DRAWINGS

Various embodiments in accordance with the present disclosure will be described with reference to the drawings, in which:

FIGS. 3A-3B are a timing diagram illustrating functionality of the SBD-based communication system of FIGS. 2A-2C according to an exemplary embodiment;

FIG. 6 is a flow chart of an example method for synchronized two-way DC-DBI encoding within an SBD-based communication system according to some embodiments.

DETAILED DESCRIPTION

Figure 1:
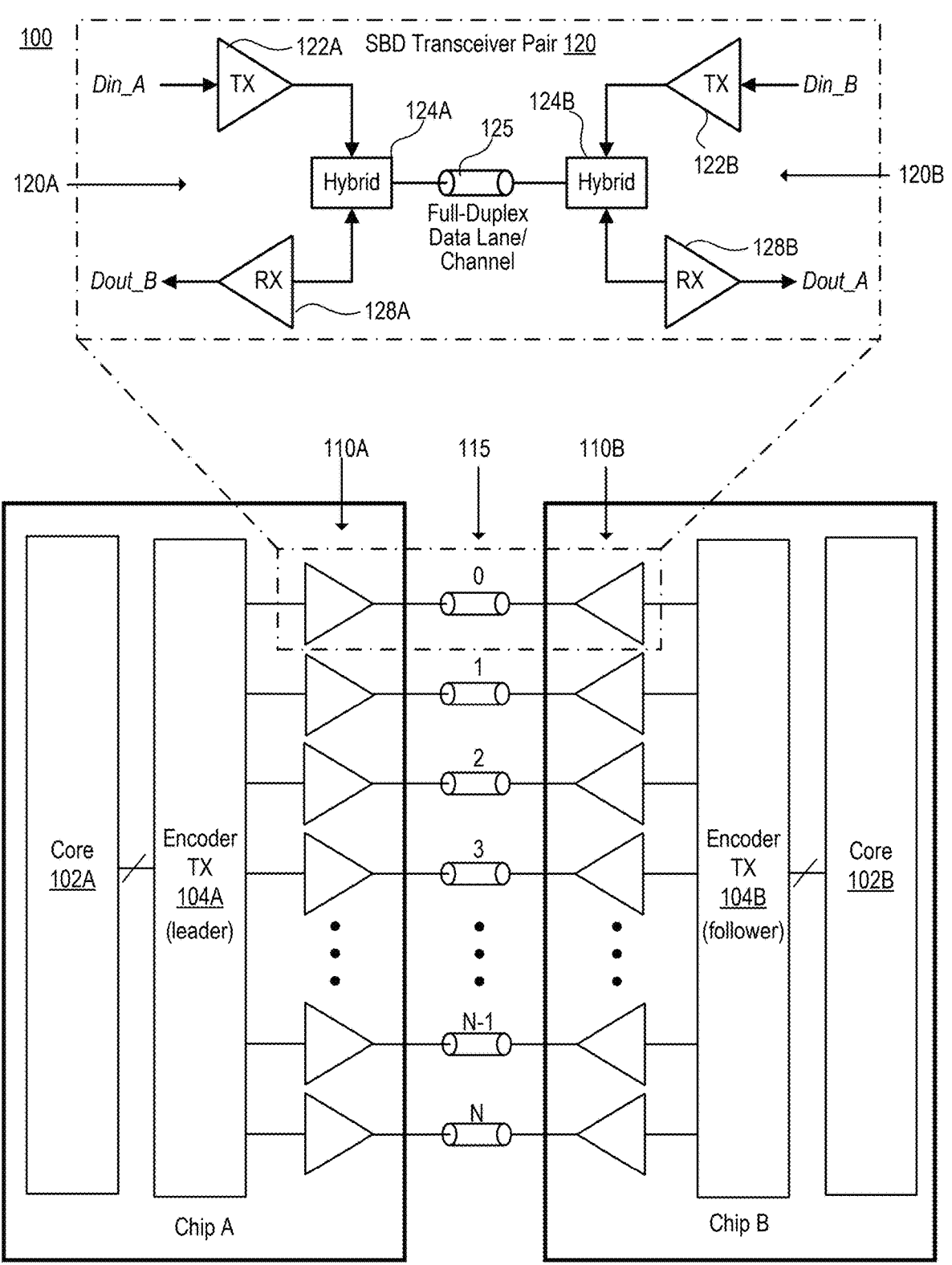
FIG. 1 is a schematic block diagram of an example SBD-based communication system implementing two-way encoding at the processor core level according to various embodiments.

In some implementations of communication system parallel interfaces (e.g., across dice or integrated circuit chips), in an attempt to reduce power consumption during data transfer across channels or data lanes (e.g., external bus running between transceivers), data bus inversion (DBI) is sometimes implemented. As is known, DBI is an encoding technique used for encoding bus transmissions for low-power systems. For example, AC-DBI is based on the fact that a large amount of power is wasted because of transitions (e.g., dynamic power consumption), especially in external buses, e.g., which are made up of data channels or lanes. Thus, reducing these transitions aids in optimizing (or reducing) power dissipation. Such reduction of power dissipation may be performed by introducing an additional signal line (e.g., INV for "inverted") to the bus lines that enables implementation of DBI. A signal issued over this signal determines whether or not the other lines should be inverted.

While DBI encoding reduces the dynamic power consumption in a parallel interface system, a large portion of the power consumption in SBD-based systems is static. This static power consumption is due to hybrid circuitry in the front-end driver of a transceiver that causes a static current flow between both sides of the bidirectional transceivers when the transceivers are transmitting opposite bits over the same channel or data lane. This static power consumption is further exacerbated by the constant current flow required to cancel the transmission data signal by the hybrid circuitry for the receiver during full-duplex communication with a paired transceiver, which was mentioned previously. The static current consumption in an SBD communication system is not reduced by the DBI encoding, and the penalty of the extra line added when using this encoding makes DBI even less attractive for SBD-based communication systems. For example, DBI encoding only reduces the dynamic power consumption, which is not the dominant source of power consumption in an SBD-based system.

In some SBD-based communication systems, DC-DBI encoding is used for power reduction purposes in Pseudo-Open-Drain (POD) electrical interfaces, e.g., employed in memory protocols such as Double Data Rate (DDR) and Graphics DDR (GDDR) memory devices. In a POD electrical interface, a DC flows through a termination resistor (coupled to the channel or bus) only when the transceiver is transmitting a zero, while transmitting a one does not cause the DC current to flow through the termination resistor. By employing DC-DBI encoding to POD data lane (or bus), the number of ones transmitted over the channel is guaranteed to be larger than the number of zeros, hence reducing average current through the termination resistors of the channel.

By employing DC-DBI encoding to the SBD data lane (or bus), the number of ones transmitted over the channel is guaranteed to be larger than the number of zeros, hence reducing average current through the termination resistors of the channel. A similar result may be achieved by inverting DBI polarity and transmitting more zeros than ones, which still ensures that more SBD pairs of transceivers are transmitting the same data, resulting in less static current flow. For example, when transceivers on both sides of the SBD channel are transmitting the same bits, this results in lower power consumption while transmitting the opposite bits results in higher power consumption. While DC-DBI encoding helps reduce average current across the SBD channel, DC-DBI encoding creates a DC imbalance across the SBD channel or data lane. For example, on average, more ones than zeroes will be transmitted (or vice versa if DBI polarity is inverted), so the DC voltage level of the channel, on average, will not be balanced (e.g., not 50% ones and 50% zeros cross the channel or data lane).

In SBD-based communication systems, sending DC-imbalanced data in complementary metal-oxide semiconductor (CMOS)-based drivers, which work at high bandwidth for long periods of time, can cause serious reliability issues such as device-aging and electromigration. Many calibration algorithms required to properly operate the SBD communication system rely on being DC-balanced between transmitted and received data. Therefore, changing this fundamental attribute to being DC-imbalanced may significantly interfere with those calibration algorithms and cause the overall SBD-based communication system to not work properly.

Aspects and embodiments of the present disclosure address the above deficiencies by employing synchronized two-way DC-DBI encoding between paired SBD transceivers in an SBD-based communication system. Specifically, in some embodiments, the DC-DBI encoding is synchronized between the transceiver pairs, and the polarity of the DC-DBI encoding can be alternatively inverted so that at times there are more ones than zeroes, and at other times there are more zeroes than ones being sent over the SBD data lanes (or bus), thus DC-balancing the SBD-based communication system.

In at least some embodiments, a communication system includes first transceivers coupled to multiple data lanes, which are coupled to second transceivers, e.g., creating multiple SBD-based transceiver pairs. In some embodiments, the system further includes a first encoder coupled to the first transceivers and a second encoder coupled to the second transceivers. In some embodiments, the first encoder, responsive to detecting a transmission signal to begin a transmission mode, determines that first bits to be transmitted by the first transceivers over the data lanes include over fifty percent of a first binary value. The first encoder may further generate a first data-bus-inversion (DBI) polarity signal that alternates in polarity and generate first DBI-encoded bits of the first bits based on the first DBI polarity signal. The first encoder may then cause the transmission signal to be transmitted to the second encoder coupled to the second plurality of transceivers. In some embodiments, the transmission signal synchronizes DBI encoding between the first and second encoders. More specifically, the second encoder can start its own DBI polarity signal concurrently with that of the first encoder and proceed to use DBI encoding to encode second bits to be transmitted by the second transceivers over the data lane. In at least some embodiments, the DBI encoding referred to here is DC-DBI encoding.

Therefore, advantages of the integrated circuits, systems, and methods implemented in accordance with some embodiments of the present disclosure include, but are not limited to, the ability to significantly reduce large static power consumption typical of SBD-based parallel interfaces that exists regardless of the dynamic change in logic bit values passed over the data lanes (or bus) of the SBD communication system. This significant reduction in static power consumption may be achieved without creating DC imbalance of data transmitted across the SBD data lanes (or bus), which in turn ensures reliability and longevity of operation despite the implemented DC-DBI encoding. These advantages are achievable through a relatively minor increase in circuitry of the encoders positioned at each side of the SBD parallel interface, e.g., compared to typical DC-DBI encoders. Other advantages will be apparent to those skilled in the art of SBD-based transceiver interface design, as will be discussed hereinafter.

FIG. 1 is a schematic block diagram of an example SBD-based communication system 100 implementing two-way encoding at the processor core level according to various embodiments. In various embodiments, the system 100 includes a first integrated circuit (IC) chip or die (e.g., Chip A) and a second IC chip or die (e.g., Chip B). In these embodiments, Chip A includes a first processing core 102A coupled to an encoder 104A, which will be referred to as a leader side, and Chip B includes a second processing core 102B coupled to a second encoder 104B, which will be referred to as a follower side. Further, in at least some embodiments, Chip A includes a first plurality of transceivers 110A coupled to the first encoder 104A, and Chip B includes a second plurality of transceivers 110B coupled to the second encoder 104B. In some embodiments, one or more of the first processing core 102A, the second processing core 102B, the first IC chip or die (Chip A), and the second IC chip or die (Chip B) are central processing units (CPUs), graphics processing units (GPUs), or data processing units (DPUs).

In various embodiments, the system 100 further includes a plurality of data lanes 115 communicatively coupled between the plurality of first transceivers 110A and the second plurality of transceivers 110B, e.g., and thus between Chip A and Chip B. In some embodiments, a communication interface (or data interface) is formed between Chip A and Chip B by the first and second plurality of transceivers 110A and 110B and the plurality of corresponding data lanes 115. In some embodiments, the plurality of data lanes 115 are also referred to as data communication channels (or a bus). In these embodiments, the second plurality of transceivers 110B are coupled in parallel to the first plurality of transceivers 110A over corresponding data lanes of the plurality of data lanes 115. Due to this coupling over a single data lane, intercoupled transceivers of the first and second plurality of transceivers 110A and 110B are simultaneous bidirectional (SBD) transceivers.

In some embodiments, the first core 102A is configured to determine and/or generate data to be passed over various ones of the first plurality of transceivers 110A. Similarly, in these embodiments, the second core 102B is configured to determine and/or generate data to be passed over various ones of the second plurality of transceivers 110B. In at least some embodiments, the first and second processing cores 102A and 102B control transitions between idle mode and active mode in terms of what data is being transmitted over which transceivers. In certain communication devices and systems, idle mode involves transmitting only ones or only zeros (sometimes referred to as dummy data) over the plurality of data lanes 115. In transitioning to active mode, the first processing core 102A and the second processing core 102B begin to send meaningful data back and forth over the plurality of data lanes 115 via the first and second plurality of transceivers 110A and 110B, respectively.

In some embodiments, whichever side is initiating active mode out of idle mode, the processing core of that side (e.g., side A or side B) becomes a leader processing core and initiates the encoder on the same side to become a leader encoder. This "leader" processing core may then send a DBI transmission signal and a DBI-enable signal to the leader encoder to initiate DC-DBI encoding in the active mode. The functionality of the first and second processing cores 102A and 102B, as well as the first and second encoders, will be discussed in more detail with reference to the subsequent figures.

In some embodiments, because the first and second plurality of transceivers 110A and 110B form SBD transceiver pairs 120, each SBD transceiver pair 120 communicates over a single data lane 125 that constitutes, for example, a full-duplex data lane over which data can be concurrently sent and received by either transceiver. For example, each SBD transceiver pair 120 may include a first transceiver 120A coupled to a second transceiver 120B over the data lane 125. In some embodiments, the first transceiver 120A includes a first transmitter 122A that transmits first data (e.g., Din_A or first bits) received from the first processing core 102A, a first receiver 128A that receives second data (e.g., Dout_B or second bits) over the data lane 125 from the second transceiver 120B, and hybrid circuitry 124A coupled between the first transmitter 122A, the data lane 125, and the first receiver 128A. In some embodiments, the hybrid circuitry 124A facilitates the full-duplex nature of data communication between the first and second transceivers 120A and 120B. For example, the hybrid circuitry 124A may cancel out interference of the first data being transmitted by the first transmitter 122A when receiving the second data over the data lane 125.

In at least some embodiments, the second transceiver 120B includes a second transmitter 122B that transmits second data (e.g., Din_B or second bits) received from the second processing core 102B, a second receiver 128B that receives the first data (e.g., Dout_A or first bits) received over the data lane 125 from the first transceiver 120A, and hybrid circuitry 124B coupled between the second transmitter 122B, the data lane 125, and the second receiver 128B. In some embodiments, the hybrid circuitry 124B facilitates the full-duplex nature of data communication between the first and second transceivers 120A and 120B. For example, the hybrid circuitry 124B may cancel out interference of the second data being transmitted by the second transmitter 122B when receiving the first data over the data lane 125.

In some embodiments, each of the first transmitter 122A (on side A) and the second transmitter 122B (on side B) includes a main driver and a replica driver (not illustrated) that are interconnected through the hybrid circuitry 124A and 124B, respectively, to allow cancellation of each data transmission signal on the same side. Thus, for example, the replica driver within the first transmitter 122A may provide the data transmission signal to the hybrid circuitry 124A, enabling the data transmission signal transmitted by the main driver to be removed from the RX signal received by the first receiver 128A. While there is always some static current flow associated with DBI encoding, this cancellation scheme causes a large static constant current flow when the DBI encoding results in opposite bit polarities to be transmitted across the data lane 125, e.g., a '0' bit transmitted by the first transmitter 122A concurrently with a '1' bit transmitted by the second transmitter 122B or a '1' bit transmitted by the first transmitter 122A concurrently with a '0' bit transmitted by the second transmitter 122B.

Thus, in various embodiments, the technical solutions disclosed herein are to reduce this constant static current flow by employing DC-DBI encoding in a way that is synchronized and concurrently alternatively inverted according to a divided clock between the first and second encoders 104A and 104B. For example, a divided clock may be generated as a DBI polarity signal used to alternate the DC-DBI encoding between a zero ('0') polarity where there are more zeros than ones transmitted across the plurality of data lanes 115 and a one ('1') polarity where there are more ones than zeroes transmitted across the plurality of data lanes 115.

Figure 2A:
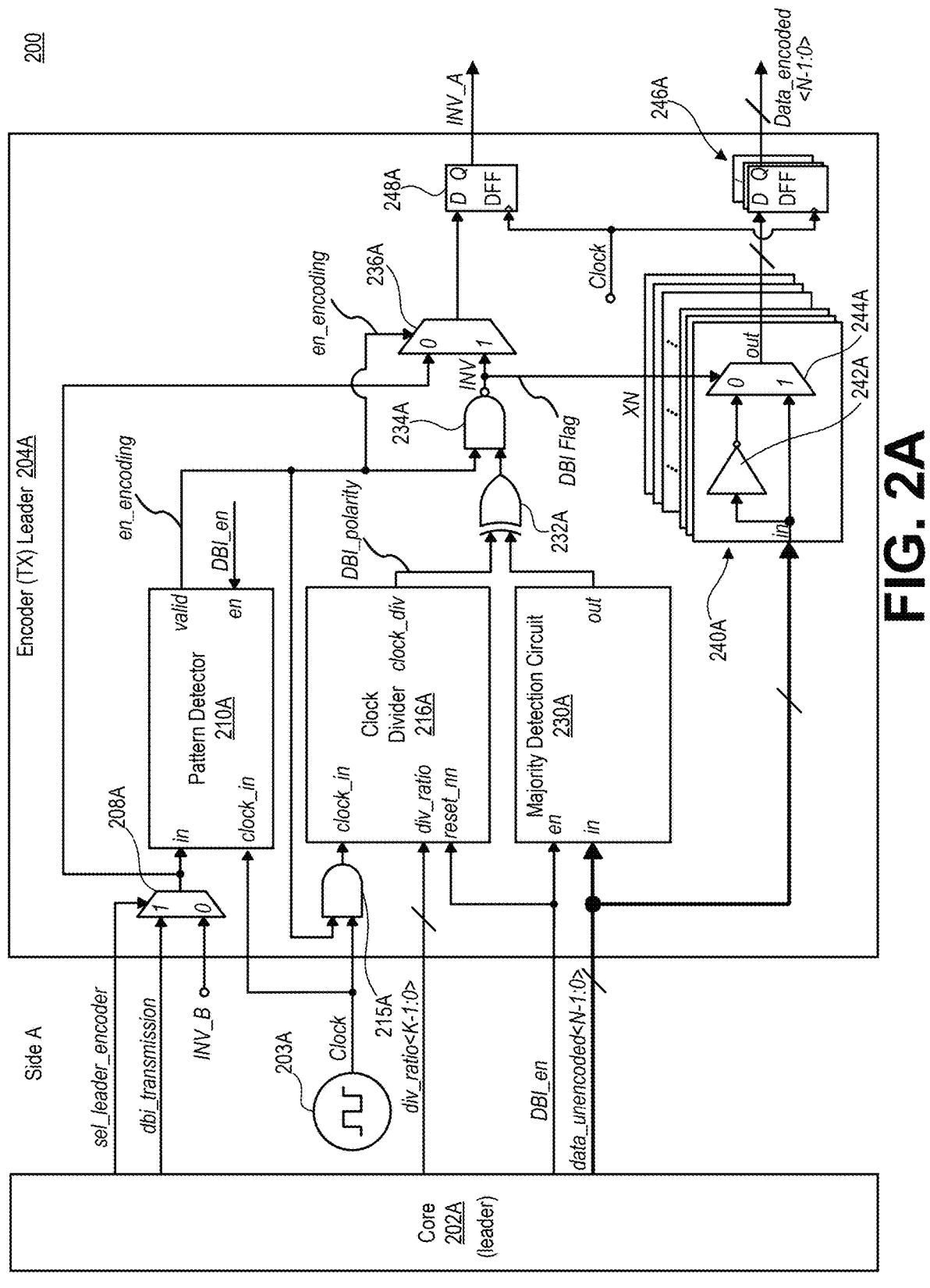
FIG. 2A-FIG. 2C are a schematic block diagram of an example SBD-based communication system configured to perform synchronized two-way DC-DBI encoding, to include a first encoder (FIG. 2A) on a first side (A) acting as leader, a plurality of SBD transceiver pairs and an RX decoder (FIG. 2B), and a second encoder (FIG. 2C) on a second side (B) acting as follower according to various embodiments.
Figure 2B:
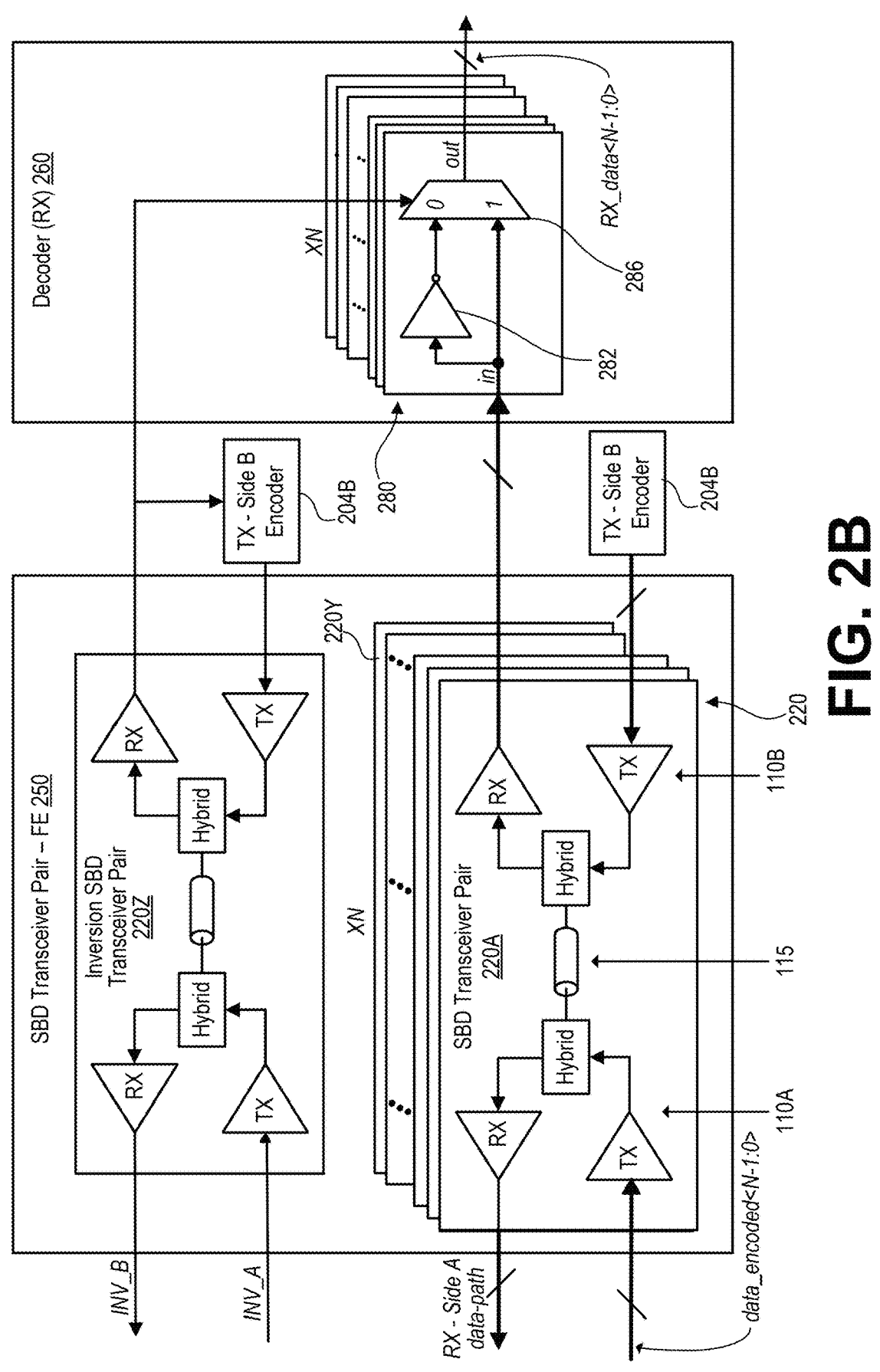
Figure 2C:
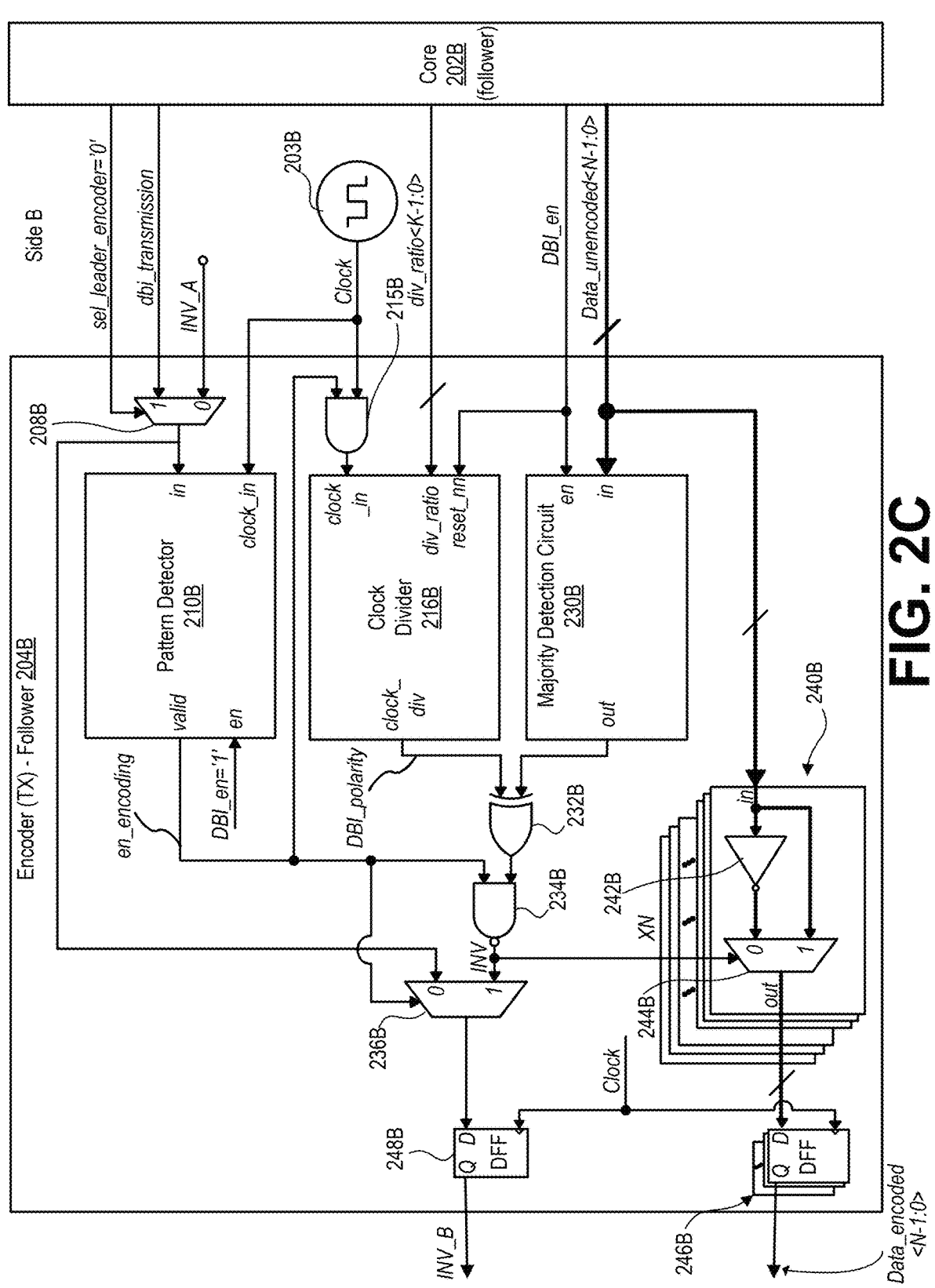

FIG. 2A-FIG. 2C are a schematic block diagram of an example SBD-based communication system 200 configured to perform synchronized two-way DC-DBI encoding, to include a first encoder 204A (FIG. 2A) on a first side (A) acting as leader, a plurality of SBD transceiver pairs 220 and an RX decoder 260 (FIG. 2B), and a second encoder 204B (FIG. 2C) on a second side (B) acting as follower according to various embodiments. In some embodiments, the communication system 200 includes a first processing core 202A acting as a leader, which means the processing core 202A initiates active transmission mode in transmitting meaningful data to the decoder 260 across an SBD transceiver pair. Thus, the processing core 202A, as leader, may assert a leader encoder selection signal (sel_leader_encoder), which selects a DBI transmission signal (dbi_transmission) input into a multiplexer 208A that feeds a pattern detector circuit 210A. In some embodiments, the DBI transmission signal has a specific bit pattern received from processing circuitry of the processing core 202A. In some embodiments, the communication system 200 further includes a clock 203A, which may or may not be provided by the processing core 202A.

In at least some embodiments, with reference to FIG. 2B, the communication system 200 further includes an SBD transceiver pair front end 250 that includes a plurality of SBD transceiver pairs 220 (e.g., 220A-220Y) to transmit data bits, and also an inversion SBD transceiver pair 220Z. In embodiments, the SBD transceiver pairs 220 includes the first plurality of transceivers 110A and the second plurality of transceivers 110B coupled to either end of the plurality of data lanes 115 (see also FIG. 1). In some embodiments, the inversion SBD transceiver pair 220Z communicates over a separate data lane to transmit either the DBI transmission signal (dbi_transmission), e.g., before start of DBI encoding, or an inversion signal (INV_A) to indicate that DBI encoding has been performed by the first encoder 204A on the first plurality of bits and provide information about the inversion of bit over the data lanes 115. In some embodiments, therefore, the first encoder 204A causes the first plurality of transceivers 110A to transmit the first plurality of DBI-encoded bits over the plurality of data lanes 115. In embodiment, the first encoder 204B also causes an inversion signal (INV) to be transmitted to the second encoder 204B to indicate whether DBI encoding has been performed on the first plurality of bits.

In some embodiments, the DBI transmission signal (dbi_transmission) is routed through the first encoder 204A, to a multiplexer 236A, optionally through a buffer (such as a D-type flip-flop (DFF) 248A for purposes of synchronous signaling by the clock 203A), through the inversion SBD transceiver pair 220Z (see INV_A path), and to the second encoder 204B of FIG. 2C. As illustrated, the DBI transmission signal from Side A is passed through a multiplexer 208B of the second encoder 204B into a pattern detector circuit 210B of the second encoder 204B (see FIG. 2C). As illustrated, the leader encoder selection signal (sel_leader_encoder) from a second processing core 202B of Side B is deasserted (e.g., a '0' value), thus selecting the DBI transmission signal from Side A. This streamlined routing of the DBI transmission signal from Side A enables immediate (e.g., concurrent) synchronizing of DBI encoding by the second encoder 204B due to triggering the pattern detector circuit 210B at the same time as triggering the pattern detector circuit 210A, which will be discussed in more detail.

In at least some embodiments, the first encoder 204 includes the pattern detector circuit 210A, a clock divider circuit 216A, a majority detection circuit 230A, and sets of inversion circuits 240A. In some embodiments, the first processing core 202A includes processing circuitry that is configured to assert a leader enable selection signal (sel_leader_encoder) that triggers providing the specific bit pattern (e.g., of the DBI transmission signal) to the pattern detector circuit 210A. In some embodiments, the pattern detector circuit 210A receives the DBI transmission signal (or an inversion signal from Side B if Side B were to initiate transmission mode as leader) and is configured to detect the specific bit pattern within the DBI transmission signal. In response to detecting the specific bit pattern, the pattern detector circuit 210A asserts an enable encoding (en_encoding) signal that activates DBI encoding within the first encoder 204A.

In embodiments, the processing core 202A asserts a DBI enable signal (DBI_en) in order to also indicate to the first encoder 204A that, as transmission mode begins, the encoder 204A is to perform DC-DBI encoding. Accordingly, in some embodiments, the majority detection circuit 230A is triggered to function by the DBI enable signal and receive unencoded bits (data_unencoded<N−1:0>) from the processing core 202A to be transmitted. The majority detection circuit 230A may detect that a plurality of first bits, which are queued to be transmitted by a first plurality of transceivers (see FIG. 2B), include over fifty percent of a first binary value. The first binary value may be either zero or one, but often will be a zero value when DBI encoding is DC-DBI encoding, which favors more ones than zeros from a power consumption perspective. Thus, if the plurality of first bits have over fifty percent of that first binary value, then the majority detection circuit 230A asserts an output (e.g., a one value).

Figure 3B:
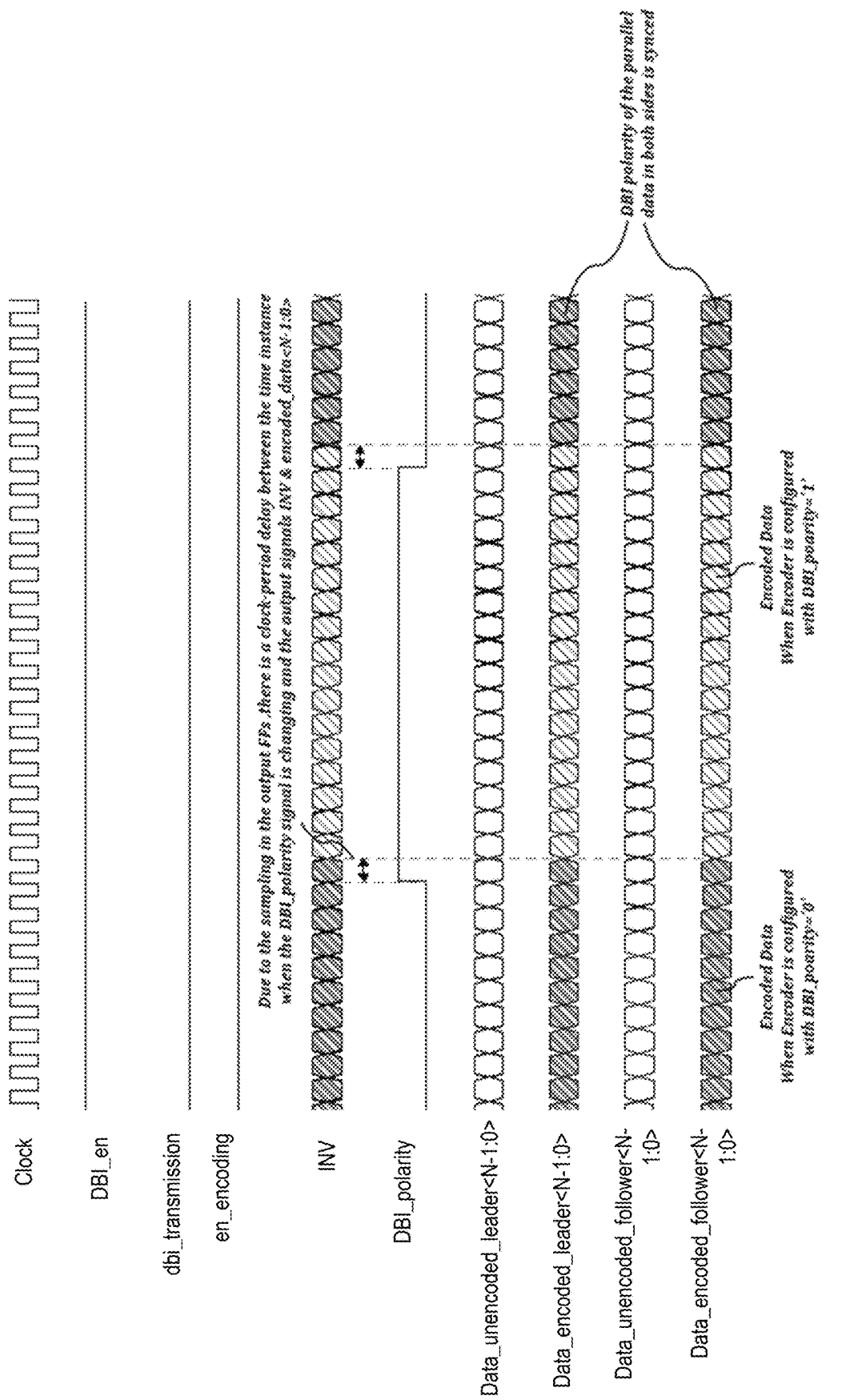

Concurrently, in at least some embodiments, the clock divider circuit 216A divides a clock, according to a division ratio (div_ratio<k−1:0>) received from the first processing core 202A, into a first DBI polarity signal (DBI_polarity) having a longer clock cycle than that of the clock 203A (see FIGS. 3A-3B). The first DBI polarity signal may alternate in polarity, and thus be employed to alternate the DC-DBI encoding between transmitting more ones than zeros and transmitting more zeros than ones, thus providing balanced DC transmission over time. In some embodiments, the first encoder 204A includes an AND gate 215A with inputs including the clock 203A and the enable encoding signal, e.g., so that the clock divider 216A receives the input clock when DC-DBI is enabled by the pattern detector circuit 210A.

In some embodiments, the first encoder 204A further includes an XOR gate 232A, an NAND gate 234A, and a multiplexer 236A. In embodiments, the XOR gate 232A receives, as inputs, the first DBI polarity signal and the output of the majority detection circuit 230A. In embodiments, the NAND gate 234A receives, as inputs, an output of the XOR gate 232A and the enable encoding signal (en_encoding). In embodiments, an output of the NAND gate 234A includes an inversion signal (INV) indicating whether the first encoder 204A outputs the first plurality of bits or a first plurality of DBI-encoded bits, which are generated by the sets of inversion circuits 240A. The output of the NAND gate 234A may also be provided as a DBI flag to the sets of inversion circuits 240A.

In differing embodiments, the multiplexer 236A causes transmission of one of the DBI transmission signal (dbi_transmission) or the inversion signal (INV) from Side A depending on a status of the enable encoding signal (en_encoding), which output is illustrated as INV_A. For example, if the enable encoding signal (en_encoding) is not asserted, the multiplexer 236A selects to output the DBI transmission signal (dbi_transmission) that is passed to the pattern detector circuit 210B of the second encoder 204B. If, however, the enable encoding signal is asserted, the multiplexer 236A selects to output the inversion signal (INV_A), which is the state of the first encoder 204A while DC-DBI encoding is performed.

In some embodiments, the unencoded bits (data_unencdoded<N−1:0>) are passed to the sets of inversion circuits 240A. Each inversion circuit of the sets of inversion circuits 240A may include an inverter 242A to invert each bit of unencoded data, and a multiplexer 244A to allow selection, based on the DBI flag, of either the unencoded bits (e.g., that were not inverted) or the encoded bits that were inverted. Because the sets of inversion circuits 240A exist for each SBD transceiver pair, the encoded data may cross the plurality of data lanes 115 (FIG. 1) as a whole based on the DBI polarity signal (DBI_polarity), which alternates. In embodiments, an optional buffer (e.g., a DFF 246A) may hold the encoded data (or unencoded) data for purposes of synchronous signaling by the clock 203A.

In some embodiments, the decoder 260 (FIG. 2B) that is located at Side B receives the encoded data (or unencoded data) from the plurality SBD transceiver pairs 220 and outputs decoded data (RX_data<N−1:0>). To do so, the decoder 260 includes a set of inversion circuits 280 that function like the sets of inversion circuits 240A in the first encoder 204A. For example, each inversion circuit includes an inverter 282 and a multiplexer 286, and the multiplexer 286 is controlled by the INV_A signal passed through the inversion SBD transceiver pair 220Z.

In at least some embodiments, with additional reference to FIG. 2C, the second encoder 204B is configured the same as the first encoder 204A, e.g., with duplicated circuitry, but acts as a follower in this example (although in different embodiments, it may also act as leader). Thus, in some embodiments, the second encoder 204B initiates DBI encoding upon receiving the DBI transmission signal (dbi_transmission) at the pattern detector circuit 210B from the first encoder 204A, as was discussed, which is synchronized with initiation of DC-DBI encoding by the first encoder 204A. In some embodiments, the second encoder 204B, responsive to receipt of the transmission signal, initiates DBI encoding of a second plurality of bits to be transmitted by the second plurality of transceivers 110B over the plurality of data lanes 115. For example, the pattern detector circuit 210B can detect the specific bit pattern as well, but within the DBI transmission signal coming from the first encoder 204A with the leader encoder selection signal (sel_leader_encoder) deasserted (e.g., '0') at the multiplexer 208B. The pattern detector circuit 210B may further assert, based on detecting the specific bit pattern, an enable encoding signal (en_encoding) that concurrently activates DBI encoding by the second encoder 204B.

In at least some embodiments, therefore, the second encoder 204B further includes the clock divider 216B and an AND gate 215B that function like the clock divider 216A and the AND gate 215A of the first encoder 204A. In some embodiments, the second encoder 204B includes a majority detection circuit 230B, an XOR gate 232B, a NAND gate 234B, a multiplexer 236B, and a DFF 248B that function as the majority detection circuit 230A, the XOR gate 232A, the NAND gate 234A, the multiplexer 236A, and the DFF 248A, respectively, of the first encoder 204A. In some embodiments, the second encoder 204B includes sets of inversion circuits 240B, each inversion circuit including an inverter 242B and 244B, which function as the sets of inversion circuits 240A of the first encoder 204A. In some embodiments, the second encoder 240 includes an optional DFF 246B to output encoded (or unencoded) data that functions as the optional DFF 246A of the first encoder 204A.

Thus, in some embodiments, using these duplicated components similarly as was discussed with reference to the first encoder 204A, the second encoder 204B generates a second DBI polarity signal that is synchronized to the first DBI polarity signal based on detecting the DBI transmission signal (dbi_transmission). In embodiments, the second encoder 204B further generates a second plurality of DBI-encoded bits of a second plurality of bits (received from the second processing core 202B) based on the second DBI polarity signal. In embodiments, the second encoder 204B further causes the second plurality of transceivers 110B to concurrently transmit the second plurality of DBI-encoded bits over the plurality of data lanes 115.

FIGS. 3A-3B are a timing diagram illustrating functionality of the SBD-based communication system of FIGS. 2A-2C according to an exemplary embodiment. From top to bottom, the timing diagram includes the clock signal from the clock 203A, the DBI enable signal (DBI_en) from the processing cores 202A and 202B, the DBI transmission signal (dbi_transmission) from the first processing core 202A, the enable encoding signal (en_encoding) generated by the pattern detector circuit 210A, the inversion signal (INV_A) output by the first encoder 204A, the DBI polarity signal (DBI_polarity) generated by the clock divider 216A, unencoded data provided by the first processing core 202A (data_unencoded_leader<N-1:0>), encoded data generated by the first encoder 204A (data_encoded_leader<N-1:0>), unencoded data provided by the second processing core 202B (data_unencoded_follower<N-1:0>), and encoded data generated by the second encoder 204A (data_encoded_follower<N-1:0>).

As can be observed, the DBI transmission signal (dbi_transmission) initiates the DBI encoding with a pattern, which indicates the start of encoding, and the first processing core 202A has already asserted the DBI enable signal. Note also that the output of the first encoder 204A shares the DBI transmission signal and the inversion signal (INV_A). As discussed, the DBI transmission signal (dbi_transmission) is transmitted during this early stage of initiating DC-DBI encoding, which provides the synchronizing with the second encoder 204B, after which the inversion signal (INV) is output over INV_A. After receiving a sufficient amount of the specific bit pattern, the pattern detector circuit 210A asserts the enable encoding signal (en_encoding). Further, the enable encoding signal (en_encoding) rises on both the first and second encoders 204A and 204B, respectively, at the same time, illustrating the synchronized start of DBI encoding within the communication system 200. After the enable encoding signal is asserted, the first encoder 204A is active and can enter transmission mode, where the inversion signal is output as INV_A.

In some embodiments, once in transmission mode, the first encoder 204A starts to provide DBI-encoded data to be transmitted across the plurality of data lanes 115, followed by perhaps a brief delay before the second encoder 204B starts to also provide DBI-encoded data to be transmitted the opposite direction across the plurality of data lanes 115. As can be observed, changes (or toggling) in polarity of the DBI polarity signal causes the DBI-encoded data bits to be synchronized across both sides, Side A and Side B. These changes of polarity based on the divided clocks 216A and 216B cause the DC-DBI encoding to alternate between a zero ('0') polarity where there are more zeros than ones transmitted across the plurality of data lanes 115 and a one ('1') polarity where there are more ones than zeroes transmitted across the plurality of data lanes 115, thus also DC-balancing the DBI encoding across the plurality of data lanes 115.

Figure 4:
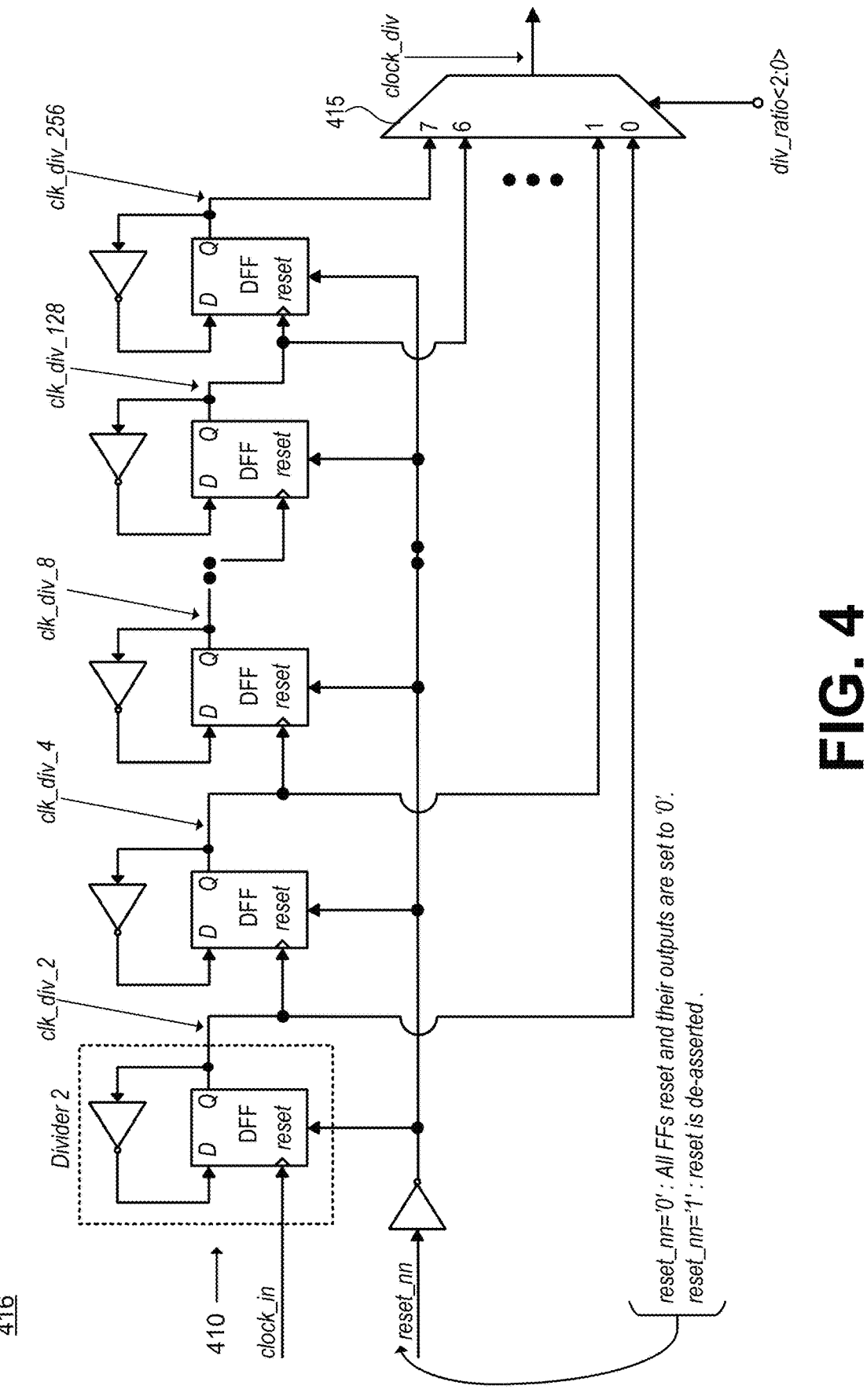
FIG. 4 is a schematic block diagram of an exemplary clock divider according to some embodiments.

FIG. 4 is a schematic block diagram of an exemplary clock divider 416 according to some embodiments. In some embodiments, the clock divider 416 is exemplary of the clock divider 216A of the first encoder 404A and/or the clock divider 216B of the second encoder 404B. In some embodiments, the clock divider 416 employs a plurality of D-type flip flops (DFFs) 410, which are chained together, e.g., a first DFF is timed by the input clock (e.g., from the clock 203A), and an output of each DFF becomes an input clock to a sequentially next DFF. In some embodiments, a reset signal (reset_nn) resets all of the DFFs 410 at the same time, e.g., to restart DBI encoding. Outputs of each DFF 410 is also provided to a multiplexer 415, which may be controlled by the division ratio signal (div_ratio<2:0>) received from the first processing core 202A. In some embodiments, the output of each respective DFF 410 is also fed back into a data input of that DFF through an inverter. As illustrated, the first DFF and the first inverter makes up a 1-to-2 divider; thus, each subsequent set of DFF and inverter provides a further divide-by-two block, dividing the input clock by $2^N$, where N is the number of cases divide-by-two blocks. Accordingly, in some embodiments, the output of each respective chained DFF 410 divides the input clock by a further multiple of two ("2"), e.g., clk_div_2, clk_div_4, clk_div_8, . . . clk_div_128, and clk_div_256.

Figure 5:
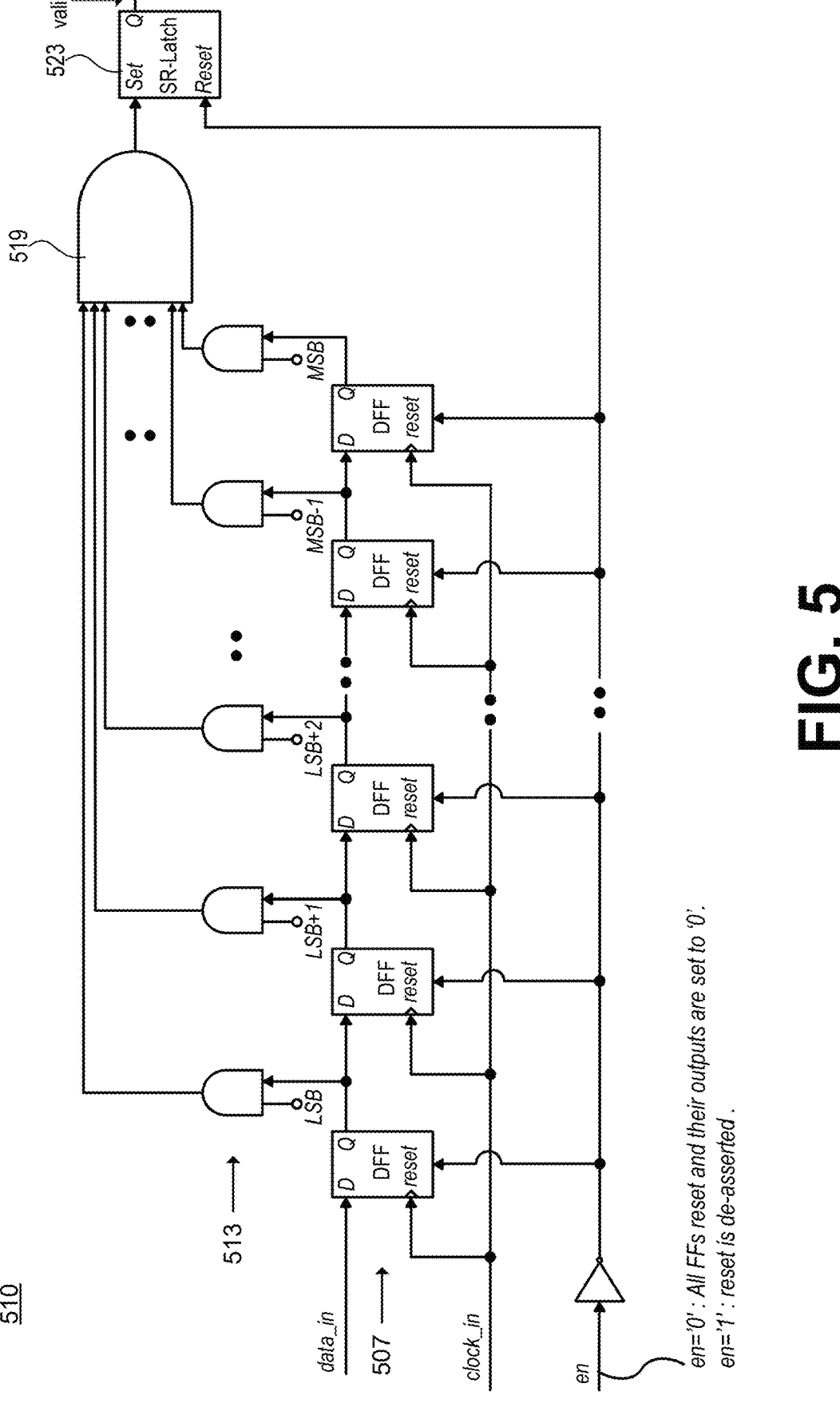
FIG. 5 is a schematic block diagram of an exemplary pattern detector circuit according to some embodiments.

FIG. 5 is a schematic block diagram of an exemplary pattern detector circuit 510 according to some embodiments. In some embodiments, the pattern detector circuit 510 is exemplary of the pattern detector circuit 210A of the first encoder 204A and/or of the pattern detector circuit 210B of the second encoder 204B. In some embodiments, the pattern detector circuit 510 includes a plurality of DFFs 507, which are chained together, e.g., a first DFF receives the input data with the pattern of bits from the DBI transmission signal (dbi_transmission) from one side of the communication system. In embodiments, a next DFF receives the output of the first DFF, and so forth through the plurality of DFFs 507. In some embodiments, the plurality of DFFs 507 are clocked by the same clock, e.g., the clock 203. In some embodiments, a reset signal (reset_nn) resets all of the DFFs 507 at the same time, e.g., to restart DBI encoding.

In some embodiments, the pattern detector circuit 510 further includes a plurality of AND gates 513, each receiving an output of a respective DFF 507 and a next bit to be compared for detecting the specific pattern, e.g., least significant bit (LSB), LSB plus one, LSB plus two, and so forth until the most significant bits of the bit pattern against which to be compared. All outputs from the plurality of AND gates 513 are fed through a common AND gate 519, the output of which may toggle a set-reset latch 523. In this way, the pattern detector circuit 510 detects a specific pattern (e.g., a series of a certain number of ones or zeros), in response to which, the output of the set-reset latch 523 is asserted (e.g., outputs the enable encoding signal).

FIG. 6 is a flow chart of an example method for synchronized two-way DC-DBI encoding within an SBD-based communication system according to some embodiments. The method 600 can be performed by processing logic comprising hardware, software, firmware, or any combination thereof. For example, the method 600 can be performed by the first encoder 204A (see FIGS. 2A-2C). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, the processing logic determines, in response to a transmission signal that initiates a transmission mode, a first plurality of bits to be transmitted by the first plurality of transceivers over the plurality of data lanes include over fifty percent of a first binary value (e.g., which may be a zero value or a one value in different embodiments).

At operation 620, the processing logic generates a first data-bus-inversion (DBI) polarity signal that alternates in polarity.

At operation 630, the processing logic generates a first plurality of DBI-encoded bits of the first plurality of bits based on the first DBI polarity signal.

At operation 640, the processing logic causes the transmission signal to be transmitted to a second encoder coupled to the second plurality of transceivers, the transmission signal to synchronize DBI encoding between the first and second encoders.

Other variations are within the scope of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A. C}, {B. C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to actions and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transforms that electronic data into other electronic data that may be stored in registers and/or memory. As non-limiting examples, a "processor" may be a network device or a MACsec device. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, the terms "system" and "method" are used herein interchangeably insofar as the system may embody one or more methods, and methods may be considered a system.

In the present document, references may be made to obtaining, acquiring, receiving, or inputting analog or digital data into a sub-system, computer system, or computer-implemented machine. In at least one embodiment, the process of obtaining, acquiring, receiving, or inputting analog and digital data can be accomplished in a variety of ways, such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface, or an inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that the subject matter claimed in appended claims is not necessarily limited to specific features or acts described. Rather, specific features and acts are disclosed as exemplary forms of implementing the claims.

What is claimed is:

1. A communication system comprising:
a first plurality of transceivers coupled to a plurality of data lanes, which are coupled to a second plurality of transceivers; and
a first encoder coupled to the first plurality of transceivers, the first encoder to, responsive to detecting a transmission signal to begin a transmission mode:
determine that a first plurality of bits to be transmitted by the first plurality of transceivers over the plurality of data lanes comprise over fifty percent of a first binary value;
generate a first data-bus-inversion (DBI) polarity signal that alternates in polarity;
generate a first plurality of DBI-encoded bits of the first plurality of bits based on the first DBI polarity signal; and
cause the transmission signal to be transmitted to a second encoder coupled to the second plurality of transceivers, the transmission signal to synchronize DBI encoding between the first and second encoders.

2. The communication system of claim 1, wherein the first binary value comprises a zero value, and wherein the first plurality of DBI-encoded bits are based on direct current (DC)-DBI encoding performed responsive to the first encoder receiving a DBI-enable signal.

3. The communication system of claim 1, wherein the first plurality of transceivers and the second plurality of transceivers comprise a plurality of simultaneous bidirectional (SBD) transceiver pairs, further comprising an inversion SBD transceiver pair that communicates over a separate data lane to transmit one of:

the transmission signal before a start of DBI encoding; or
an inversion signal to indicate that DBI encoding has been performed by the first encoder on the first plurality of bits.

4. The communication system of claim 1, wherein the first encoder is further to:
cause the first plurality of transceivers to transmit the first plurality of DBI-encoded bits over the plurality of data lanes; and
cause an inversion signal to be transmitted to the second encoder to indicate that DBI encoding has been performed on the first plurality of bits.

5. The communication system of claim 1, further comprising:
the second plurality of transceivers; and
the second encoder, wherein the second encoder is to, responsive to receipt of the transmission signal, initiate DBI encoding of a second plurality of bits to be transmitted by the second plurality of transceivers over the plurality of data lanes.

6. The communication system of claim 5, wherein the second encoder is further to:
generate a second DBI polarity signal that is synchronized to the first DBI polarity signal based on detecting the transmission signal;
generate a second plurality of DBI-encoded bits of the second plurality of bits based on the second DBI polarity signal; and
cause the second plurality of transceivers to transmit the second plurality of DBI-encoded bits over the plurality of data lanes.

7. The communication system of claim 1, wherein the first encoder comprises a clock divider circuit to divide a clock, according to a division ratio, into the first DBI polarity signal having a longer clock cycle than that of the clock.

8. The communication system of claim 1, wherein the transmission signal comprises a specific bit pattern received from processing circuitry, and wherein the first encoder further comprises:
a pattern detector circuit to:
detect the specific bit pattern; and
assert an enable encoding signal that activates DBI encoding; and
a majority detection circuit to determine that the first plurality of bits to be transmitted comprise over fifty percent of the first binary value.

9. The communication system of claim 8, further comprising:
an XOR gate to receive, as inputs, the first DBI polarity signal and an output of the majority detection circuit;
a NAND gate to receive, as inputs, an output of the XOR gate and the enable encoding signal, wherein an output of the NAND gate comprises an inversion signal indicating whether the first encoder outputs the first plurality of bits or the first plurality of DBI-encoded bits; and
a multiplexer to cause transmission of one of the transmission signal or the inversion signal depending on a status of the enable encoding signal.

10. The communication system of claim 8, further comprising a processing core that includes the processing circuitry, the processing core to:
assert a leader encoder selection signal that triggers providing the specific bit pattern to the pattern detector circuit; and assert a DBI enable signal to reset a clock divider circuit, which generates the first DBI polarity signal, and to activate the majority detection circuit.

11. A communication system comprising:
a first plurality of transceivers coupled to a plurality of data lanes;
a first encoder coupled to the first plurality of transceivers;
a second plurality of transceivers coupled to the plurality of data lanes; and
a second encoder coupled to the second plurality of transceivers;
wherein the first encoder is to, responsive to detecting a transmission signal to begin a transmission mode:
determine that a first plurality of bits to be transmitted by the first plurality of transceivers over the plurality of data lanes comprise over fifty percent of a first binary value;
generate a first data-bus-inversion (DBI) polarity signal that alternates in polarity;
generate a first plurality of DBI-encoded bits of the first plurality of bits based on the first DBI polarity signal; and
cause the transmission signal to be transmitted to the second encoder; and
wherein the second encoder is to, responsive to receipt of the transmission signal, initiate DBI encoding of a second plurality of bits to be transmitted by the second plurality of transceivers over the plurality of data lanes.

12. The communication system of claim 11, wherein the first binary value comprises a zero value, and wherein the first plurality of DBI-encoded bits are based on direct current (DC)-DBI encoding performed responsive to the first encoder receiving a DBI enable signal.

13. The communication system of claim 11, wherein the first plurality of transceivers and the second plurality of transceivers comprise a plurality of simultaneous bidirectional (SBD) transceiver pairs, further comprising an inversion SBD transceiver pair that communicates over a separate data lane to transmit an inversion signal and the transmission signal, wherein the inversion signal indicates that DBI encoding has been performed by the first encoder on the first plurality of bits.

14. The communication system of claim 11, wherein the first encoder is further to:
cause the first plurality of transceivers to transmit the first plurality of DBI-encoded bits over the plurality of data lanes; and
cause an inversion signal to be transmitted to the second encoder to indicate that DBI encoding has been performed on the first plurality of bits.

15. The communication system of claim 11, wherein the second encoder is further to:
generate a second DBI polarity signal that is synchronized to the first DBI polarity signal based on detecting the transmission signal;
generate a second plurality of DBI-encoded bits of the second plurality of bits based on the second DBI polarity signal; and
cause the second plurality of transceivers to transmit the second plurality of DBI-encoded bits over the plurality of data lanes.

16. The communication system of claim 11, wherein the first encoder comprises a clock divider circuit to divide a clock, according to a division ratio, into the first DBI polarity signal having a longer clock cycle than that of the clock.

17. The communication system of claim 11, wherein the transmission signal comprises a specific bit pattern received from processing circuitry, and wherein the first encoder further comprises:

a pattern detector circuit to:

detect the specific bit pattern; and assert an enable encoding signal that activates DBI encoding; and a majority detection circuit to determine that the first plurality of bits to be transmitted comprise over fifty percent of the first binary value.

18. The communication system of claim 17, further comprising:

an XOR gate to receive, as inputs, the first DBI polarity signal and an output of the majority detection circuit;

a NAND gate to receive, as inputs, an output of the XOR gate and the enable encoding signal, wherein an output of the NAND gate comprises an inversion signal indicating whether the first encoder outputs the first plurality of bits or the first plurality of DBI-encoded bits; and a multiplexer to cause transmission of one of the transmission signal or the inversion signal depending on a status of the enable encoding signal.

19. The communication system of claim 17, further comprising a processing core that includes the processing circuitry, the processing core to:

assert a leader encoder selection signal that triggers providing the specific bit pattern to the pattern detector circuit; and assert a DBI enable signal to reset a clock divider circuit, which generates the first DBI polarity signal, and to activate the majority detection circuit.

20. A method of operating a communication system comprising a first plurality of transceivers coupled to a second plurality of transceivers via a plurality of data lanes, and a first encoder coupled to the first plurality of transceivers, wherein the method comprises:

determining, by the first encoder, in response to a transmission signal that initiates a transmission mode, a first plurality of bits to be transmitted by the first plurality of transceivers over the plurality of data lanes comprise over fifty percent of a first binary value;

generating, by the first encoder, a first data-bus-inversion (DBI) polarity signal that alternates in polarity;

generating, by the first encoder, a first plurality of DBI-encoded bits of the first plurality of bits based on the first DBI polarity signal; and causing, by the first encoder, the transmission signal to be transmitted to a second encoder coupled to the second plurality of transceivers, the transmission signal to synchronize DBI encoding between the first and second encoders.

* * * * *